C. HUTCHINS.
Corn-Planters.

No. 143,826.  Patented Oct. 21, 1873.

Witnesses:

Inventor:
C. Hutchins
Per
Attorneys.

UNITED STATES PATENT OFFICE.

CHARLES HUTCHINS, OF AUBREY, KANSAS, ASSIGNOR TO HIMSELF AND ABRAM LARGE, OF SAME PLACE.

IMPROVEMENT IN CORN-PLANTERS.

Specification forming part of Letters Patent No. 143,826, dated October 21, 1873; application filed August 30, 1873.

*To all whom it may concern:*

Figure 1:
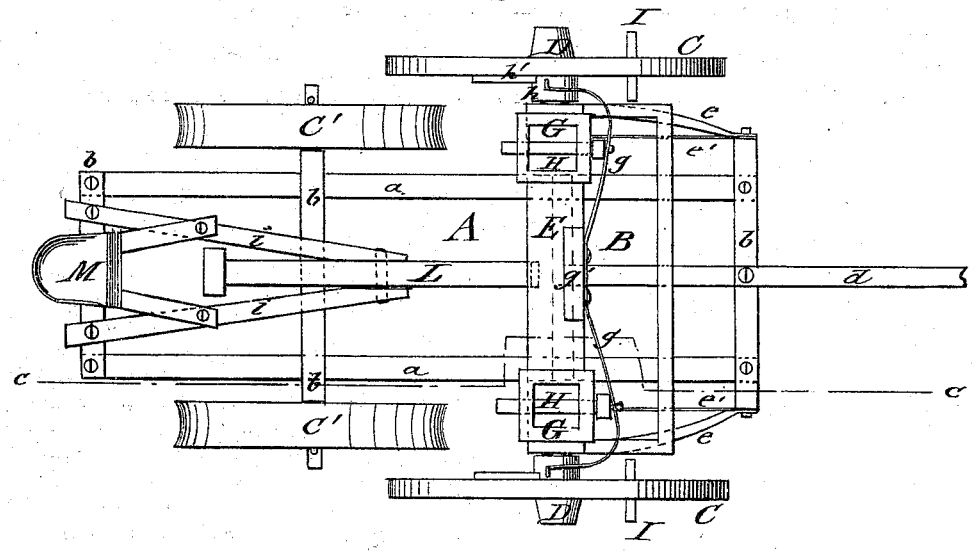
Figure 2:
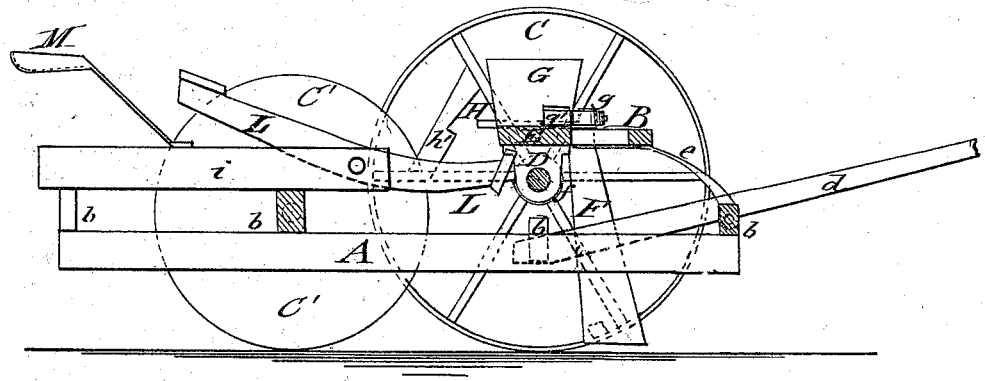

Be it known that I, CHARLES HUTCHINS, of Aubrey, in the county of Johnson and State of Kansas, have invented a new and useful Improvement in Corn-Planter, of which the following is a specification:

In the accompanying drawing, Figure 1 represents a top view of my improved corn-planter; and Fig. 2, a side elevation of the same, partly in section, on the line *c c*, Fig. 1.

Similar letters of reference indicate corresponding parts.

The object of my invention is to furnish to farmers an improved corn-planter which will save time and labor in dropping the seed and marking out the ground, and will run light, and also plant the corn in straight rows. My invention consists of a seed-dropping and row-marking attachment, which is placed on a frame with light wheels in front of the rear frame, which has concave covering-wheels, with the driver's seat and regulating-lever.

In the drawing, A represents the main frame of the planter, which consists of longitudinal side pieces *a*, connected by lateral pieces *b*, of suitable size and strength to support the different parts. The tongue *d* is attached to the front cross-pieces *b*, and projects as far as necessary. The front cross-piece *b* projects at both sides beyond the longitudinal pieces *a*, and has the strong metallic arms *e e'* pivoted to it, which connect with the frame B of the seed-dropping attachment. Frame B is carried on light wheels C, which are keyed fast to the axle D. The journals *f*, in which axle D turns, are attached to the lower side of the main cross-beam E of frame B. Cross-beam E carries, also, applied to its front side, the plows F, which are either stationary or hung by a chain, like the tooth of a seed-drill, for different depths. The plows F are made light and sharp, to cut their way through the ground, being formed by two plates joined under a sharp angle, and held rigidly in position by the lower arms *e'*. The upper parts of the plows F connect, by tubes or otherwise, with the hoppers G, into which the corn is placed and conducted, by a suitable counting and dropping mechanism, to the ground.

The seed-dropping mechanism consists of a slide, H, which moves in guide-slots of hopper G, at the bottom of the same. The slide-piece H may be regulated in the usual manner, so that the required number of seed is dropped at each motion of it.

The fore end of slide H is connected to a band-spring, *g*, the ends of which are applied to a central block, *g'*, of beam E. The outer end of band-spring G is curved, and supplied with a sidewise-bent lug or projection, *h*, which is acted upon by a notched piece, *h'*, attached to spokes of front wheels C. There may be one or more notches or knobs, *h'*, applied to the wheels C, according to the distance at which the corn is to be planted. If the circumference of the wheel is eight feet, and the corn is to be planted four feet apart, two notches are required; if it is to be dropped at two feet distance, four, and so in proportion, according to the size of the wheel and the distance of the corn. The notches *h'* carry spring G and slide H forward, and drop the seed inside of plow F to the ground. Any similar device by which the regular action of the slide is secured may be used. As soon as the spring G is released the slide H closes the hopper till actuated again by a notch. As the wheels C are stationary on the axle D, the action of the hoppers is produced at the same time. Cross-pieces I are attached to the circumference of wheels C diametrically opposite to notches *h'*, for the purpose of marking the exact place at which the corn has been dropped. The driver is thereby enabled to see at any time whether he is planting in rows or not. As soon as he finds himself not exactly in line, he can, by placing his foot on the lever, raise the front wheels on the pivots, and regulate the planting by simply turning the wheels forward or backward, which allows to plant as straight one way as the other. The broad concave hind wheels C' of main frame A are placed back of the plows F, and serve to cover the corn dropped in the furrows. Some suitable mechanism cleans the concave part of the wheels C' of the earth, for bringing back the soil toward the center of the same, which is further assisted by the wheels being made wider than plows F.

By means of a lever, L, which is operated by the foot of the driver when sitting on seat M, the pivoted frame B with the wheels C is raised, and thereby the planting interrupted at will, as required in turning the planter or moving from place to place Lever L is pivoted to obliquely-inclined pieces $i$, which are secured to rear cross-pieces $b$. Seat M is also attached and supported by iron rods on pieces $i$.

The seed-dropping and row-marking attachments may also be used in connection with other planters.

Having thus described my invention, I claim as new and desire to secure by Letters Patent—

1. As an improvement in corn-planters, the combination of main frame A, having concave wheels C', lever L, and seat M, with the pivoted frame B, having plows F and the seed-dropping and row-marking mechanism, substantially as specified.

2. The combination of cross-beam E, pivoted frame B, hoppers G, slide-pieces H, and springs $g$, with front wheels C, having notched pieces $h'$, forming the seed-dropping mechanism, as described.

CHARLES HUTCHINS.

Witnesses:
RAY A. WISWELL,
JOHN T. LITTLE.